United States Patent [19]
MacDonald

[11] 4,086,841
[45] May 2, 1978

[54] HELICAL PATH MUNITIONS DELIVERY

[76] Inventor: Gilmour C. MacDonald, 55 Warwick Dr., Rte. 1, Shalimar, Fla. 32579

[21] Appl. No.: 436,364

[22] Filed: Jan. 22, 1974

Related U.S. Application Data

[63] Continuation-in-part of Ser. No. 177,769, Sep. 3, 1971, abandoned.

[51] Int. Cl.$^2$ .............................................. F41G 3/24
[52] U.S. Cl. .................................... 89/1.5 E; 235/401
[58] Field of Search ........................... 33/229, 230, 231; 89/1.5 R, 1.5 E, 1.5 S, 41 E, 41 EA, 41 AA; 235/61.5 R, 61.5 D; 244/137 R

[56] References Cited

U.S. PATENT DOCUMENTS

| | | | |
|---|---|---|---|
| 2,433,843 | 1/1948 | Hammond et al. | 89/41 EA |
| 2,437,463 | 3/1948 | Ford | 89/41 EA |
| 3,474,704 | 10/1969 | Faxen et al. | 89/1.5 R |
| 3,689,741 | 9/1972 | Sjoberg et al. | 235/61.5 D |
| 3,724,817 | 4/1973 | Simons | 89/1.5 R |

*Primary Examiner*—Stephen C. Bentley
*Attorney, Agent, or Firm*—Carroll F. Palmer

[57] ABSTRACT

Improved aerial weapons comprise an aircraft capable of controlled flight relative to a preselected target, means to automatically control the flight path of said aircraft, means to continuously determine the position of said aircraft relative to said target, means to automatically impose upon said flight path a helical component which at one instant in time passes through a munition release point appropriate for the said target, and automatic means to release the munition at the said munition release point. Additionally, the weapon may comprise means to create a visual presentation of said target as an image erect with respect to the pilot, regardless of the instantaneous attitude of the aircraft.

Such aerial weapons, used to deliver air-to-ground munitions upon an intended target from an optimum position, speed and altitude can substantially reduce aircraft attrition from enemy guns or defensive aircraft.

8 Claims, 4 Drawing Figures

HELICAL PATH MUNITIONS DELIVERY

CROSS-REFERENCE TO RELATED APPLICATION

Reference is made under provisions of 35 USC 120 to copending application Ser. No. 177,769, filed Sept. 3, 1971, now abandoned, the contents of which are incorporated herein by reference. This application is a continuation-in-part of Ser. No. 177,769.

BACKGROUND OF THE INVENTION

1. Field of the Invention

This invention relates to military aerial devices and methods. More particularly, it relates to improved aerial weapons which comprise an aircraft capable of controlled flight relative to a preselected target for the delivery of munitions or for other military purposes with a greater reduction in attrition from enemy guns, defensive aircraft or the like than has been possible heretofore in the air-to-ground delivery of munitions. The invention is further concerned with improvements in aerial weapons specifically designed to degrade the ability of an enemy to predict, by automatic tracking means or otherwise, the future position of the attacking aircraft, thereby lowering the defensive potential of the enemy while at the same time making it possible to deliver the munitions from the optimum position, speed and attitude.

2. Description of the Prior Art

Aircraft attrition in present-day warfare is extremely costly, in men and materiel, with the result that both delivery tactics and munitions have been radically modified in an attempt to reduce aircraft losses to an acceptable level. Bombs are released at much higher altitudes and as a result accuracy suffers. This means that more sorties and more bombs are required to achieve an equivalent level of target damage. At the longer distances, particularly in the jungle, the pilot is less likely to have his target positively located, which further increases the chances for a miss. Strafing ground targets with Gatling Guns, firing 6,000 rounds per minute each, is very hazardous.

Supersonic delivery of munitions has become the airman's obsession in the belief that, despite the demonstrated decreases in delivery accuracy, higher speeds will somehow reduce the total aircraft losses for a given level of target damage. This is highly controversial.

Vast sums are being spent on expensive and exotic missiles with seeker systems that can be launched far from the target, and hopefully, track down the target and score a direct hit. This approach, while expensive, may suffice where atmospheric conditions permit. The situation is, however, complicated in most military engagements, particularly in geographic areas where, in the winter, at least, ceilings will be below 3,000 feet more than half the time. Under present circumstances, operating fighter-bomber aircraft against enemy 12.7 mm, 23 mm and 57 mm radar-controlled AA guns at these low altitudes can only result in extremely high losses.

In spite of the many detailed analyses of optimal delivery techniques, and notwithstanding the continuing efforts to reduce the physical vulnerability of the aircraft to gun and missile attack, much must yet be done to reduce the vulnerability of aircraft, especially those delivering air-to-ground weapons.

OBJECTS

A principal object of this invention is the provision of improved aerial weapons comprising aircraft capable of controlled flight relative to a preselected target for use in air-to-ground delivery of munitions upon a target with reduced attrition due to defensive measures by the enemy. Further objects include the provision of:

1. New methods for the air-to-ground delivery of munitions upon a selected target from a flight-controlled aircraft capable of mitigating enemy damage to the aircraft.

2. Automatic delivery of weapons from the optimum position and attitude for that munition, including (a) terrain permitting, Napalm tanks dropped at minimum altitude while parallel to the ground, (b) dispensers sowing bomblets by the hundreds or the thousands released at an ideal location, and (c) precise placement and alignment of the aircraft at that instant in time when the target and the aircraft flight path parameters meet the necessary weapons delivery criteria at which time the munitions are automatically released. Where enemy troops are in close proximity to friendly troops, the weapons delivery hazard may be reduced by a weapons delivery axis parallel to the "front lines".

3. A flight path that makes it more difficult for an enemy fighter pilot to effectively attack the friendly aircraft, which is especially vulnerable during the critical period of munitions delivery.

4. An improved aerial weapon capable of a flight path that permits a much closer and/or slower approach to the target before releasing munitions, enabling more positive identification of the target, and a more accurate delivery of the munitions.

5. A method of air-to-ground munitions delivery that provides a maximum of mission preplanning in programming the computer-controlled flight profile to reduce the workload on the pilot, or to greatly simplify tactical operations in the event that pilotless aircraft are employed.

6. Such an air-to-ground attack method that permits automatic roll-out of the attacking aircraft from an approach spiral, into essentially 1 "g" straight flight at the optimum point to fire guns and rockets, dispense smoke, defoliant agents, etc.

7. Air-to-ground weapons and methods that permit programmed evasive action while descending blind through clouds, to place the attacking aircraft in the optimum position for weapons delivery, and to provide for automatic breakoff of the attack in the event that the cloud ceiling at the target is below the preset minimum. This presumes that the pilot may wish to make minor corrections to the predicted munitions impact point, when he emerges from the clouds. However, many munitions home on infrared or electromagnetic radiations where no image is provided for the pilot, although he will receive a "lock on" signal.

8. Air-to-ground weapons and methods that deceive the enemy as to the target to be attacked because, at no time is the axis of the airplane run-in spiral lined up with the actual target. This is important in situations where enemy gunners, especially if concealed, will not divulge their ppositions by opening fire unless they feel that they are being attacked.

9. Automatic means for controlling an airplane in a helical path, including a rolling spiral, of substantial diameter and essentially constant "g", the locus thereof describing an approximate circle around the target area, including forward air controller (FAC) aircraft employing such a spiral to reduce attrition while using laser beams to designate the target for other aircraft, seeker missiles, etc.

10. Automatic evasive maneuvers such as an appropriately-timed increase in aircraft "g" when a surface-to-air missile (SAM) is fired, together with an automatically-revised flight path for the balance of the attack, including automatic release of munitions at a newly-computed release point, with programmed and/or automatically released or actuated countermeasures.

11. Means to facilitate visual identification of distant aerial targets as is presently being accomplished by the Northrop TISEO system in USAF F-4E aircraft.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

These objects are accomplished according to the present invention by combining an aircraft capable of controlled flight with means automatically to cause the aircraft to fly a controlled helical flight path to a preselected terrestrial point or area. Such a combination may be used for observation or target designation purposes, but in the preferred embodiment of the invention, the combination provides aerial weapons comprising means automatically to release munitions toward a selected target while the aircraft flies the automatically controlled helical path to deliver munitions upon the preselected target from an optimum position, speed and attitude.

Basically, the improved aerial weapons of the invention comprise in combination:

A. an aircraft capable of controlled flight,

B. means to continuously determine the position of said aircraft relative to a preselected target, C. means to automatically impose a helical component upon the flight path of the aircraft which at one instant in time passes through an appropriate release point, and, D. means to automatically release a munition at said munition release point.

Advantageously, aerial weapons of the invention additionally comprise means to create a visual presentation of a selected target and its surrounding as an image erect with respect to the pilot regardless of the instantaneous attitude of the aircraft. Further, it is advantageous for the means which makes the visual presentation of the erect target image, to include means to impose a visual spot on the target image which continuously indicates the computed munitions impact point.

As a further feature, the aircraft may include manual control means to reposition the target image, including the visible spot designating the predicted munitions impact point, to a new target as may be required. This repositioning of the predicted munitions impact point, acting through the aircraft computer and autopilot, also changes flight parameters to deliver the munitions at the new impact point.

The foregoing objects are further accomplished in accordance with the invention by a method for air-to-ground delivery of munitions upon a selected target from a flight-controlled aircraft so as to mitigate damage to the aircraft by defensive action of an enemy which comprises:

a. causing the aircraft to fly a helical path in passage toward the selected target automatically under the control of a target position determining device, and b. automatically discharging munitions from the aircraft while it is flying said helical path.

BRIEF DESCRIPTION OF THE DRAWINGS

A more detailed understanding of the new military aerial devices and methods of the invention may be had by reference to the accompanying drawings in which.

DESCRIPTION OF PREFERRED EMBODIMENTS

Figure 2:
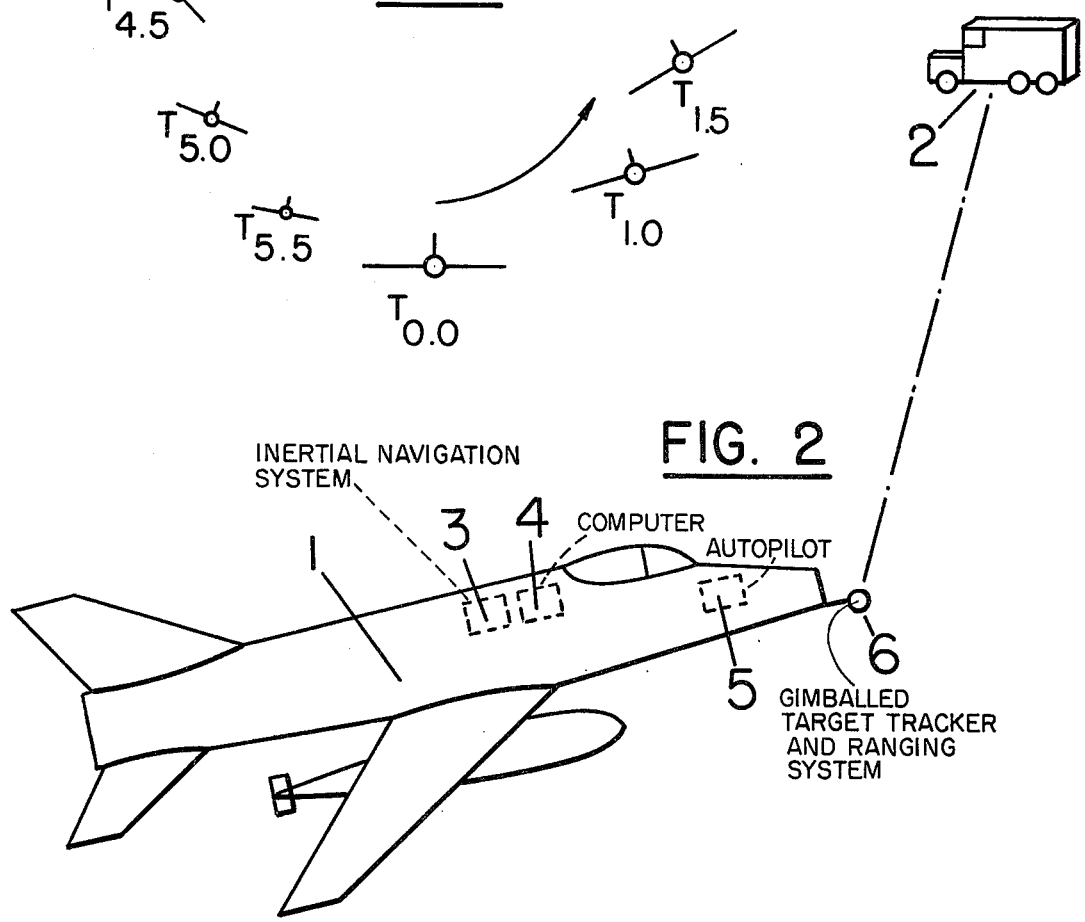
FIG. 2 is a diagrammatic presentation of an aerial weapon in accordance with the invention attacking a target.

On the preferred embodiment of the invention schematically illustrated in FIG. 2, the aerial weapon is a military aircraft 1 in the process of attacking a target 2. Inertial navigation system 3 provides continuous aircraft position data to the onboard computer 4 which controls the attack flight path by means of the autopilot 5.

The gimballed target tracker and ranging system 6 may be controlled by an automatic seeker system such as on the Sidewinder missile, or by the computer 4 so that it remains pointed at the target 2 throughout the helical aircraft attack. In either event, it provides the computer with both continuous range to the target and the instantaneous angle between the line of flight and the line of sight to the target. In addition, the tracker/ranger 6 will, in most usages, aim a TV, low light level TV (LLTV), forward looking infrared (FLIR), laser, radiometric, or other type of camera to provide a visual image of the target area in the pilot's video scope or the gun sight combining glass. Since the airplane is continuously rolling in the attack mode, this visual presentation of the target area must be continuously erected with respect to the pilot so that he can make aim point corrections if needed.

With this data and with pickoffs from the inertial navigation system 3, the computer 4 can, through the autopilot 5, place the airplane in the precise position desired for weapons release, and effect this release automatically.

According to the invention, the necessary inputs to the airborne computer 4 are achieved by combining an inertial navigation system 3 with ranging means which continuously tracks the selected target. Many such inertial navigation systems exist, and, in general, operate by integrating accelerations along three mutually perpendicular axes. They can, therefore, determine location only with respect to a selected reference point. Since the point of aircraft departure is known, inertial navigation systems may also be used for other purposes, such as navigating to the initial point (IP) for the attack, or for reporting presumably encoded, aircraft position data back to a master situation board at headquarters. This will be especially necessary if remotely piloted aircraft are used. Further, the inertial navigation system, in concert with the computer and the autopilot, can reposition the aircraft for a second attack if needed, with different attack profiles, escape patterns and munitions.

Provisions will, advantageously, be included for the pilot to assume manual control of the airplane at any time, should it become necessary to abandon the mission programmed into the computer. In this connection, it must be remembered that at the lowest, and hence most dangerous portion of the flight profile, the pilot's video presentation will agree with the actual horizon, and he can make the corrections needed.

Since the gimballed target tracker and ranging system, 6, is continuously pointed at the target, a coaxial laser beam can be used to designate the target for attack by other aircraft equipped with laser seeker missiles.

In aerial weapons of the invention intended for the delivery of munitions in a hostile environment, there will be included computer means to control the attacking aircraft in a flight path that, in effect, cannot be solved by the predictors used to control antiaircraft artillery (AAA).

Of the various non-linear flight paths which could be used to degrade lead-angle computations for AAA, it appears that a large diameter "barrel roll" or helix is the most effective means of avoiding aimed fire. An infinite choice of accelerations, attack speeds, helix angles and diameters is available as well as continuous variations thereof. Accelerations will be limited by human physiology in piloted aircraft, and by structural and drag considerations in the case of remotely piloted vehicles (RPVs).

If the aircraft maintains both a constant "g" (acceleration) and a constant rate of angular roll as it proceeds along a helical path, the axis of that helical path will approximate a ballistic trajectory, must like that of a bomb after release. If, however, the aircraft acceleration is held more or less constant, at 2 "g" for example, the rate of roll may be varied as the aircraft rolls along the helical path, and the axis of the helix may be turned in any desired direction. Computer control of the airplane roll rate, along with control of speed, acceleration and helix angle can therefore provide for placement of the attacking airplane at the programmed altitude, attitude, speed, and munitions delivery position deemed best for that particular tactical situation.

To attain the maximum advantages of the invention, the aircraft computer, 4, must perform a number of computational functions.

It must be capable of being programmed for the optimum attack and escape paths, depending on the tactical situation, the munitions carried, the weather, etc., and must release the munitions at precisely the correct point.

It must be capable of continuously computing the munitions impact point, by integrating all pertinent flight factors, together with the instantaneous angle between the airplane flight path and the look axis to the target, and indicating, on the pilot's video scope or on his gun sight combining glass, the erected visual image of the target area with the predicted munitions impact point. This, of course, assumes the programmed automatic munitions delivery mode is allowed to proceed to completion.

Given these inputs, the computer can compare the flight path actually being flown with that flight profile programmed into the computer prior to takeoff, and the pilot can make the adjustments that may be needed due to wind change, for example.

When the pilot, by the normal use of his controls, changes the aim point during an attack, the computer must, through the autopilot, change the flight path parameters as necessary, and release the munitions at that new position necessary to hit the redesignated target.

If the target is being tracked automatically by seeker means such as infrared, electronic emission, or one of the various type of imaging seekers, and has "locked on" the target, the computer must schedule the appropriate attack spiral and munitions release within the limitations imposed by the programmed flight parameters. In this case the pilot has little to do.

For weapons delivery under conditions that preclude visual observation of the target, or make the use of radar hazardous due to enemy use of radar-seeking missiles, provisions should be made for computer presentation to the pilot of a pre-taped or synthetic erected image of the target area. Thus, when the pilot emerges from a low ceiling, he can, if necessary, adjust the aim point very quickly if necessary, release automatically, and still rolling, pull back up into the clouds.

Under some conditions, the pilot may need to break off the attack, and the computer must, through the autopilot, make the flight path changes called for by the pilot. If the pilot and his visual display are upside down with respect to the real horizon, and the pilot pulls back on the control stick to gain altitude, he will, of course, experience a negative "g" situation, or at least a rapid roll to an erect position.

At the completion of the weapons delivery period, the aircraft can resume a helical path in either direction as dictated by the programmed escape path. Since many anti-aircraft weapons are markedly less effective against going-away targets, and in view of the additional drag induced by this spiral maneuver, it is possible that spiral departures from the target area, if used, will be at a lower "g" level and for a limited time only.

Assuming that the target can be located and tracked during at least a portion of a very low altitude horizontal spiral, it may be possible to minimize radar visibility by timing the roll rate so that the attacker is at the bottom of the roll, and very near the ground (terrain permitting) when the radar beam sweeps by. In any event, the radar cross-section will vary by at least an order of magnitude. In this case, the flight profile might even be very low altitude flight, straight and level, with appropriately-timed and computer-controlled "pop up" rolls to verify the target location, and if necessary, to provide better data for the computer-controlled flight path and munitions release. This may require automatic terrain-following means such as that presently used in the Grumman A-6A and the McDonnell F-4C aircraft. Since the axis of the spiral does not point at the target, the munitions can be released during the rising portion of the low-level spiral. This, in effect, tosses the munitions off to the side of the helical flight path, while the airplane rolls down the helix and away from the munitions impact point, minimizing the hazard from munitions fragments. For this reason, and in view of the expected reduction in attrition, this attack mode may be highly effective against antiaircraft artillery and SAM installations. An aircraft spiralling along close to the ground is a most difficult target for a conventional fighter attack from above. Daytime conditions in a desert area, for example, will make certain types of missile seeker systems of little use.

In certain tactical situations, especially in heavily defended areas, attrition can be further reduced by employing multiple-aircraft attacks from several directions at the same time. This forces the defending gunners to dilute their fire by engaging several targets arriving simultaneously from different directions, and further, maximizes the weight of weapons delivered while minimizing the total exposure time. Further, many enemy AAA installations control the fire of several guns from a single radar and fire-control computer, and thus can engage only one target at a time.

On multiple, crossing, simultaneous, munitions drops crossover times must be precisely controlled to assure safe separation from the munitions or munitions fragments. This will require that the aircraft computers "talk" to each other during the attack, and adjust the flight profiles accordingly. It is therefore a further major purpose of the subject invention to make this type of high-intensity attach technically and tactically feasible.

An on-board computer for an aircraft in accordance with the invention should be programmed for an attack upon a target to include the following factors:

1. The IP (initial point) selected, and the distance and direction of the target.

2. Routes to and from the target to minimize attrition and terrain clearance problems.

3. Enemy weapons to be encountered, including their fields of fire. Given the weapons characteristics, the computer can, if desired, schedule the attack spiral so that the aircraft is at some opposite portion of the spiral when the enemy bullet passes. Infinite latitude exists in the choice of attack speed, spiral diameter, accelerations involved, etc. While physiological factors will be present, possibly limiting the useful accelerations for this attack profile to about the 2 – 6 "g" range, this will not affect remotely piloted vehicle (RPV) usage. Certain enemy missile systems can be reduced in effectiveness by similar tactics. Ground-to-air missiles are usually intended for bomber defense and may not be able to cope with 4 – 6 "g" at the right time.

4. Characteristics of the weapons to be delivered, to include optimum release point, altitude, and delivery speed, the clearance necessary for safety from fragments of the munition if this is a factor, whether the weapons can be released during the 2, 3, or 4 "g" spiral or will require at least a short run directly at the target, as with guns, rockets, and some guided munitions, etc.

Some military situations require an aircraft to circle the target area for an extended period. Forward air controller (FAC) aircraft, for example, frequently circle a target to keep it in view while awaiting the arrival of fighter-bomber aircraft to deliver the munitions. Where the target area is well defended, FAC aircraft may suffer heavy losses. The automatic means for controlling an airplane in a helical path permits the airplane to fly a controlled rolling spiral of substantial diameter and essentially constant acceleration describing an approximate circle about the target area. This permits FAC aircraft to operate effectively while mitigating damage from the enemy. Such aircraft using laser beams to designate the target for other aircraft, seeker missiles, or the like, may comprise gimballed and computer-pointed laser designators so that the designated laser spot on the target will remain steady regardless of the aircraft attitude and position.

Figure 3A:
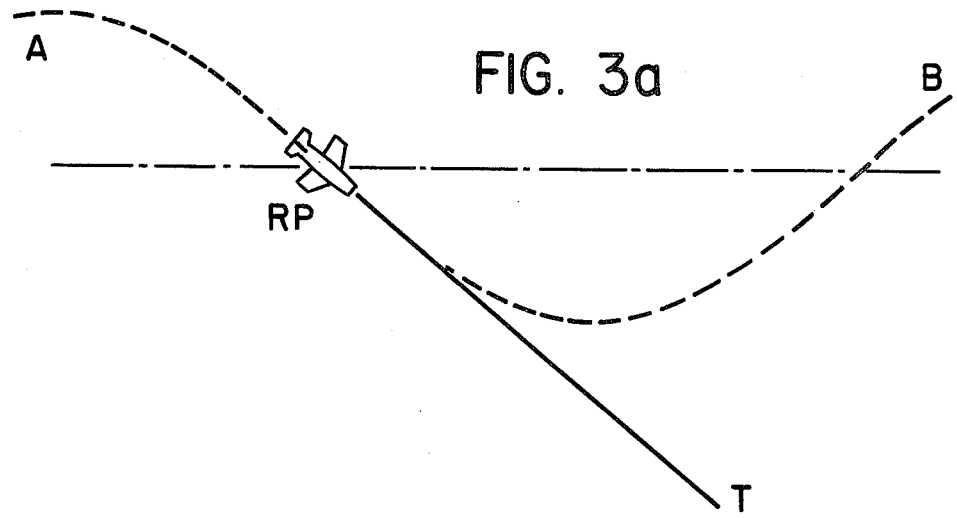
FIGS. 3a and 3b depict an embodiment of the simplest type for release of bombs or the like, concurrently with a helical maneuver in accordance with the invention to reduce aircraft attrition by enemy action.
Figure 3B:
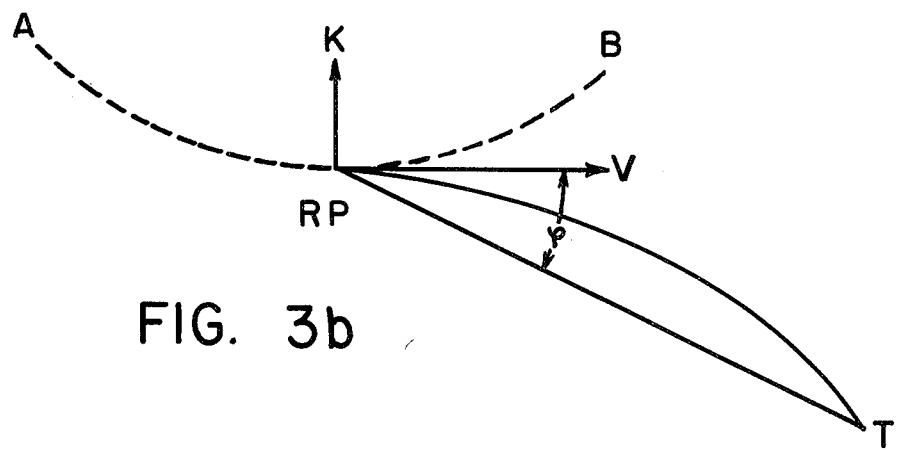

Regarding the specific factors involved in weapons release in accordance with the invention, FIGS. 3a and 3b depict the simplest case for the release of bombs and the like while performing a helical evasive maneuver to minimize attrition, wherein the curved dotted line A-B represents a portion of the said helical maneuver. In this simplest form, the vector representing the instantaneous aircraft acceleration K due to lift (in the helix) is along a vertical line, and the velocity vector of the aircraft V lies in a vertical plane thru the target. Assuming a horizontal helix, such as that viewed longitudinally in FIG. 1, the bomb release points meeting the above criteria will occur at the bottom of the helix, and at the top, while inverted. In this connection it will be noted that virtually all bombing systems, whether for horizontal bombing, dive bombing, toss bombing, or combinations thereof, compute solely (neglecting wind effects) in a vertical plane thru the target.

Figure 1:
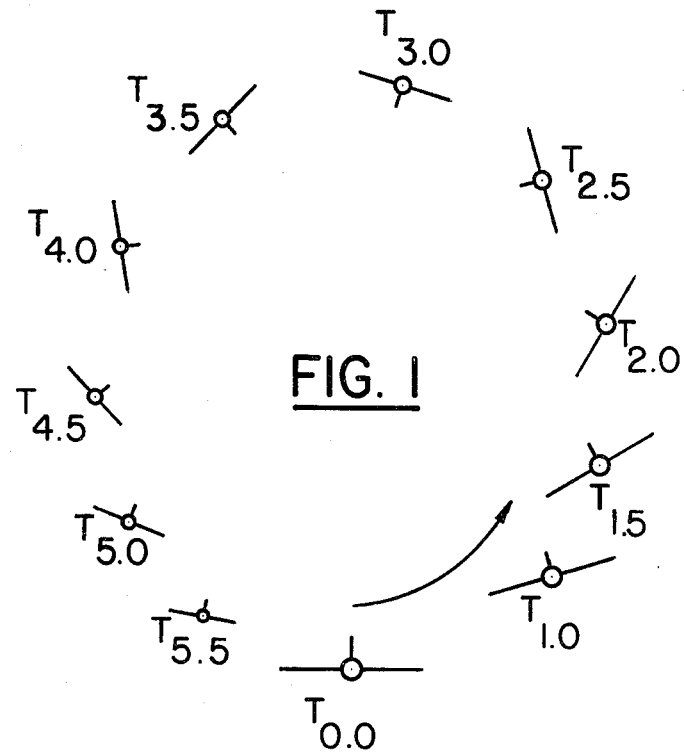
FIG. 1 is a diagrammatic presentation of a helical flight path for an aircraft in accordance with the invention.

FIG. 3a depicts a portion of a horizontal helical flight path such as that of FIG. 1, as viewed from vertically overhead. At bomb release, K, the vector representing the instantaneous aircraft acceleration due to lift is vertical (perpendicular to the paper) and the velocity vector V of the aircraft lies along the projection of line RP-T, representing the release point and the target respectively.

FIG. 3b illustrates bomb release in a vertical plane which contains both the release point and the target. In this embodiment, instantaneous aircraft acceleration due to lift K, the velocity vector of the aircraft V, and the sighting axis, RP-T, of the computer-pointed tracking/ranging scope all lie in one vertical plane. The curved line from RP to T represents the ballistic trajectory of the bomb.

If the instantaneous velocity vector of the aircraft is assumed to be horizontal, the weapons release situation becomes identical to that in conventional horizontal bombing. Specific elements of data required by such conventional horizontal bombing systems are:

1. Instantaneous aircraft heading, attitude, altitude and velocity. These factors are known from the inertial navigation system 3 and the computor 4.

2. Instantaneous line of sight to the target, slant range to the target, and the angle $\phi$, (phi) between the horizontal and the line of sight to the target. This data is continuously available from the tracker/ranger 6.

As is well known to those skilled in the art, there are many formulae which employ the above inputs to determine the proper bomb release point.

The munitions carried by a fighter aircraft, especially those carried on the wings, are at a significant distance from the aircraft center of gravity. It therefore will be desirable for the computer to program the aircraft roll rate to be zero at the instant of bomb release if the smallest possible bomb impact pattern is desired.

EXAMPLES

The further understanding of the military aerial devices and methods of the invention may be obtained from the following examples in accordance with the invention.

EXAMPLE 1.

A single engine jet aircraft traveling in level flight at 625 FPS velocity equipped with an on-board computer, inertial navigation system, autopilot and gimablled target tracker and ranging system as described in connection with FIG. 2 is caused to fly the helical path under the control of the computer covering an approximate diameter of 1,000 feet. The initial aircraft heading is 28.2° to the right of the helix axis and a positive roll to the left is performed by the aircraft. Bank, angle and roll rate are as seen from the aircraft proceeding along the aircraft velocity vector. FIG. 1 represents a plot of aircraft attitude and related data during the helical flight path as viewed along the axis of a horizontal helix and illustrates the variations in roll rate and bank angle which maintain a linear and horizontal helix axis. Pertinent data involved in the helical flight path is reported in the following table:

TABLE 1

| TIME SECONDS | X | Y | Z | $V_z$ | BANK ANGLE | ROLL RATE DEG/SEC | ANGULAR ACCEL. |
| --- | --- | --- | --- | --- | --- | --- | --- |
| 0.0 | 0 | 0 | 0 | 550 | 0° | 12.8 | 0 |
| 0.5 | 175 | 38 | 333 | 546 | 6.8 | 15.5 | + 9.6 |
| 1.0 | 347 | 159 | 659 | 540 | 16.0 | 21.7 | + 19.2 |
| 1.5 | 425 | 346 | 961 | 534 | 30.0 | 42.0 | + 63.2 |
| 2.0 | 435 | 580 | 1240 | 528 | 59.8 | 74.4 | + 63.5 |
| 2.5 | 326 | 821 | 1480 | 522 | 104.0 | 109.8 | + 63.2 |
| 3.0 | 82 | 980 | 1681 | 519 | 164.0 | 120.6 | + 1.2 |
| 3.5 | −223 | 920 | 1868 | 520 | 225.1 | 120.0 | − 21.6 |
| 4.0 | −400 | 703 | 2093 | 525 | 280.0 | 88.4 | − 63.4 |
| 4.5 | −440 | 458 | 2352 | 531 | 317.2 | 59.6 | − 63.3 |
| 5.0 | −383 | 243 | 2647 | 537 | 338.2 | 28.0 | − 40.6 |
| 5.5 | −254 | 90 | 2963 | 543 | 349.0 | 18.4 | − 12.4 |
| 6.0 | − 90 | 9 | 3292 | 548 | 356.8 | 13.6 | − 5.4 |
| 6.25 | 0 | 0 | 3460 | 550 | 360.0 | 12.8 | 0 |

In the foregoing table, the Z axis is along the course line, X is to the right, and Y is up. All dimensions are in feet.

In other cases, different flight combinations are used to produce a curved helical path for the aircraft.

EXAMPLE 2.

In use, one sequence of operation is as follows: On reaching the target area, the pilot of an aircraft in accordance with the invention, slews the gimballed tracking and ranging system 6 to point at the selected target area, and engages the automatic tracking system. The programmed helical evasive action may, but not necessarily will, be initiated at this time also. In simplest form, this gimballed tracking and ranging means is a TV or low light level TV camera, preferably equipped with a zoom lens, with servos and gimbals to permit continuous tracking anywhere in the forward hemisphere of the attacking aircraft. Alternately, radar or forward-looking infrared or laser systems known in the art are used. regardless of the airplane position or attitude, the pilot's video presentation from this camera is electronically erected with respect to the pilot, be he on the ground or in the airplane. This video presentation may or may not be on the gunsight glass, and should also include a spot or "pipper" which indicates the predicted munitions impact point. This is also the point that aircraft range is being computed to by laser, radar, or whatever means is used.

As long as the "pipper" on the pilot's erected video presentation remains on the selected target, the helical attack profile is progressing as programmed into the computer, and the pilot has no need to refer to his attitude instruments. Should aim point revisions be required, the pilot, by normal control movements and pressures, regardless of the airplane attitude at that instant, can, through the computer, make the desired corrections. The combination of stabilized zoom optics and the relatively long viewing time results in more precise location of the target, and the smoothed navigation system inputs to the aircraft computer serve to automatically correct for "bumpy air."

ADDITIONAL DESCRIPTION

Various components which are combined by this invention to provide the new military aerial devices and methods are known and have been described in various publications. Hence, those skilled in this art will be able to select, in consideration of the foregoing disclosure of the components to be assembled in accordance with the invention, from among such known equipment, those components which will be most suitable for the particular aircraft to be constructed. Thus, such factors as size, weight, need for redundancy and similar considerations which are not critical to the invention, but are of significance to the aircraft configuration, may dictate use of one known component over another. Some examples of specific units that may be used in accordance with the invention are mentioned below in further explanation of it. As previously indicated, the preceding description is quite schematic to provide a disclosure of the general type of components and their functional interrelationships in the aircraft and methods of the invention.

In the present state of the art, inertial navigation systems utilize digital and/or analog computers. Such computers are designed to solve navigation and weapon trajectory equations, control inertial and radiant sensors, provide steering commands, provide visual displays, etc. One example of such a system is in the Ling-Temco-Vought/USAF A-7D and Navy A-7E attack aircraft which employs an integrated navigation/weapon delivery system controlled by an IBM System/4Pi, Model TC-2 digital computer (see brochure No. 71-4/G-243 entitled "A-7D Nav/Weapon Delivery System" published April 1971 by Vought Aeronautics). This has produced an order-of-magnitude improvement in navigational accuracy, and a 300% improvement in weapons delivery accuracy is expected. The computer solves navigation and weapon trajectory equations, and can be programmed for more than 100 types of weapons and nine delivery modes. A gun mode, rocket mode, and a re-attack mode permits attacking the target on the second pass. A "Heads Up" visual display is provided for the pilot. (Aviation Week and Space Technology, Jan. 6, 1969, Pages 93-97.)

A weapons delivery system, especially if piloted, that is to fly a computer-controlled descending helix, frequently in the clouds and close to the ground will require a high order of component reliability. Redundancy is also important to reduce losses due to enemy action (see "Experimental Strapdown Redundant Sensor Inertial Navigation System" discussed in the September, 1970 J. Spacecraft, Vol. 7 No. 9, pages 1070-4).

Conventional autopilots are analog devices providing some fixed compensation based on assumed vehicle dynamics and environment. Recent major advances in digital technology, together with the added demands of aircraft guidance and navigation makes it very attractive to combine all these functions in a central digital computer. Since the autopilot function in a digital system is a software routine, it can be changed at will without the constraints of a hard-wired device. (J. Spacecraft, Vol. 7 No. 10, October 1970, "Design of an Optimal-Adaptive Digital Autopilot", pages 1192-7, and Sub-references 1-4 and 7 thereto).

Tracking/ranging systems have been developed to a high degree of precision. This is important because locating the target is often the most difficult part of the attack. Recent new developments in electro-optics increase vision at night and in the jungle, locate targets by optical, laser, holographic radar, forward-looking and conventional infrared systems, radiometric and electromagnetic means, and can provide an image of the target area to include an indication of what, if anything, is moving in the target area. TISEO, installed in USAF F-4E aircraft by Northrop Corporation, is an example of one system (see "New Roles Grow for Electro Optics", Aviation Week and Space Technology, June 22, 1970, pages 155-67).

The embodiments of the invention in which an exclusive property or right is claimed are defined as follows:

1. A method for the air-to-ground delivery of a munition upon a selected target from a flight-controlled aircraft so as to mitigate damage to the aircraft by defensive action of an enemy which comprises:
   A. automatically causing the aircraft to fly a helical path in passage toward the selected target under the control of a target position determining device, said helical path comprising at least one complete roll of the aircraft through approximately 360° of bank angle along a substantially horizontal helix axis,
   B. automatically continuously determining the position of said aircraft relative to said target, and
   C. automatically discharging a munition from said aircraft flying said helical path and while the velocity vector of the aircraft lies in a vertical plane approximately through said target.

2. The method of claim 1 wherein said munition is a bomb.

3. A method for the air-to-ground delivery of a munition upon a selected target from a flight-controlled aircraft so as to mitigate damage to the aircraft by defensive action of an enemy which comprises:
   A. automatically causing the aircraft to fly a helical path in passage toward the selected target under the control of a target position determining device, said helical path comprising at least one complete roll of the aircraft through approximately 360° of bank angle,
   B. automatically continuously determining the position of said aircraft relative to said target by means comprising a gimballed target tracker and ranging system, an inertial navigation system and a computer, and
   C. automatically discharging a munition from said aircraft toward said target while the aircraft is flying said helical path.

4. A method for the air-to-ground delifery of a munition upon a selected target from a flight-controlled aircraft so as to mitigate damage to the aircraft by defensive action of an enemy which comprises:
   A. automatically causing the aircraft to fly a helical path in passage toward the selected target under the control of a target position determining device, said helical path comprising at least one complete roll of the aircraft through approximately 360° of bank angle,
   B. automatically continuously determining the position of said aircraft relative to said target by means of a gimballed target tracker and ranging system, an inertial navigation system and a computer,
   C. continuously creating a visual presentation of said target and its surroundings as an image erect with respect to the operator of the aircraft regardless of the instantaneous attitude of the aircraft with respect to the terrestrial horizon, and
   D. automatically discharging a munition from said aircraft toward said target while the aircraft is flying said helical path.

5. The method of claim 4 wherein a visible marker continuously indicating the predicted munitions impact point is centrally imposed on said image.

6. The method of claim 1 wherein the diameter of the helix of said helical path is at least equal to 0.1 the length of one complete roll of the aircraft through 360° of bank angle.

7. The method of claim 5 wherein said target image may be repositioned to a new target.

8. The method of claim 7 wherein said gimballed target tracker and ranging system includes laser target designator means.

* * * * *